(12) United States Patent
Lee et al.

(10) Patent No.: US 11,051,216 B2
(45) Date of Patent: Jun. 29, 2021

(54) METHOD FOR REPORTING MEASUREMENT RESULT AND DEVICE SUPPORTING THE SAME

(71) Applicant: LG ELECTRONICS INC., Seoul (KR)

(72) Inventors: Youngdae Lee, Seoul (KR); Jaewook Lee, Seoul (KR); Sangwon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/761,233

(22) PCT Filed: Nov. 15, 2018

(86) PCT No.: PCT/KR2018/013994
§ 371 (c)(1),
(2) Date: May 1, 2020

(87) PCT Pub. No.: WO2019/098702
PCT Pub. Date: May 23, 2019

(65) Prior Publication Data
US 2020/0359276 A1      Nov. 12, 2020

Related U.S. Application Data

(60) Provisional application No. 62/587,313, filed on Nov. 16, 2017.

(51) Int. Cl.
*H04W 36/00* (2009.01)
(52) U.S. Cl.
CPC ... *H04W 36/0058* (2018.08); *H04W 36/0072* (2013.01); *H04W 36/00835* (2018.08)

(58) Field of Classification Search
CPC ....... H04W 36/0058; H04W 36/00835; H04W 36/0072
See application file for complete search history.

(56) References Cited

U.S. PATENT DOCUMENTS

| | | | |
|---|---|---|---|
| 2013/0114512 A1* | 5/2013 | Yamamoto | H04W 56/001 370/328 |
| 2013/0155891 A1* | 6/2013 | Dinan | H04L 5/0053 370/252 |

(Continued)

FOREIGN PATENT DOCUMENTS

| | | |
|---|---|---|
| WO | 2015/041484 | 3/2015 |
| WO | 2016/137306 | 9/2016 |

OTHER PUBLICATIONS

PCT International Application No. PCT/KR2018/013994, International Search Report dated Feb. 14, 2019, 2 pages.

(Continued)

*Primary Examiner* — Ernest G Tacsik
(74) *Attorney, Agent, or Firm* — Lee Hong Degerman Kang Waimey

(57) ABSTRACT

Provided are a method of reporting measurement result and a device supporting the method. According to one embodiment of the present disclosure, a method for reporting measurement result in a wireless communication system includes: receiving a measurement configuration including information on a first cell and a second cell which is related to the first cell; performing measurement on the first cell and the second cell; and transmitting a result of the measurement on the first cell and the second cell, when a reporting of measurement on the first cell is triggered.

8 Claims, 13 Drawing Sheets

(56) References Cited

U.S. PATENT DOCUMENTS

| | | |
|---|---|---|
| 2017/0086254 A1 | 3/2017 | Lee et al. |
| 2017/0273069 A1* | 9/2017 | Tenny ................ H04W 52/242 |
| 2020/0169990 A1* | 5/2020 | Takeda ............... H04W 52/325 |
| 2020/0221464 A1* | 7/2020 | Nielsen ................ H04L 5/1469 |

OTHER PUBLICATIONS

"3rd Generation Partnership Project; Technical Specification Group Radio Access Network; Evolved Univesal Terrestrial Radio Access (E-UTRA) and NR; Multi-connectivity;" 3GPP TS 37.340 V1.1.1, (Oct. 2017), Release 15, 58 pages.

Samsung, "Measurement result contents for SN addition in MRDC," 3GPP TSG-RAN WG2 #99bis, R2-1711400, Prague, Czech, Oct. 9-13, 2017, 4 pages.

\* cited by examiner

METHOD FOR REPORTING MEASUREMENT RESULT AND DEVICE SUPPORTING THE SAME

CROSS-REFERENCE TO RELATED APPLICATIONS

This application is the National Stage filing under 35 U.S.C. 371 of International Application No. PCT/KR2018/013994, filed on Nov. 15, 2018, which claims the benefit of U.S. Provisional Application No. 62/587,313, filed on Nov. 16, 2017, the contents of which are all hereby incorporated by reference herein in their entirety.

TECHNICAL FIELD

The present invention relates to a wireless communication system, and more particularly, to a method for reporting measurement result optimized to supplementary uplink (SUL) and a device supporting the same.

BACKGROUND

Efforts have been made to develop an improved $5^{th}$-generation (5G) communication system or a pre-5G communication system in order to satisfy a growing demand on radio data traffic after commercialization of a $4^{th}$-generation (4G) communication system. A standardization act for a 5G mobile communication standard work has been formally started in 3GPP, and there is ongoing discussion in a standardization working group under a tentative name of a new radio access (NR).

Meanwhile, an upper layer protocol defines a protocol state to consistently manage an operational state of a user equipment (UE), and indicates a function and procedure of the UE in detail. In the discussion on the NR standardization, an RRC state is discussed such that an RRC_CONNECTED state and an RRC_IDLE state are basically defined, and an RRC_INACTIVE state is additionally introduced.

Meanwhile, In NR, Supplementary Uplink (SUL) is introduced for enhancing UL coverage. In case of SUL, the UE may be configured with 2 ULs for one DL of a same cell, and uplink transmissions on those two ULs are controlled by the network to avoid overlapping PUSCH transmissions in time. Thus, initial access may be supported in each of the uplink. For initial access in a NR cell configured with SUL, the UE may select the SUL carrier if and only if the measured quality of the DL is lower than a broadcast threshold. Once started, all uplink transmissions of the random access procedure remain on the selected carrier.

SUMMARY

According to a prior art, while performing handover or secondary node (SN) addition procedure, there was no way to notify the UE that target cell or SN supports SUL. Thus, the UE cannot measure the SUL carrier prior to the handover or secondary node (SN) addition procedure.

According to one embodiment of the present invention, a method performed by a user equipment (UE) in a wireless communication system is provided. The method may comprise: receiving a measurement configuration including information on a first cell and a second cell which is related to the first cell; performing measurement on the first cell and the second cell; and transmitting a result of the measurement on the first cell and the second cell, when a reporting of measurement on the first cell is triggered.

The first cell may provide a first uplink (UL) carrier and a first downlink (DL) carrier, and the second cell may provide a second UL carrier.

A frequency of the first UL carrier may be higher than a frequency of the second UL carrier.

The measurement configuration may inform the UE that the result of the measurement on the second cell needs to be reported with the result of the measurement on the first cell.

The first cell may be a specific cell among at least one of cells managed by a secondary node (SN), and the second cell may be a supplementary uplink (SUL) cell managed by the SN for the first cell in a secondary node addition procedure.

The first cell may be a specific cell among at least one of cells managed by a target base station (BS), and the second cell may be a supplementary uplink (SUL) cell managed by the target BS for the first cell in a handover procedure.

The measurement configuration may include at least one of identity (ID) of the first cell, ID of the second cell, UL/DL carrier of the first cell and UL/DL carrier of the second cell.

The result of the measurement on the first cell and the second cell may be transmitted to a master node (MN) in a secondary node addition procedure.

The result of the measurement on the first cell and the second cell may be transmitted to a source base station (BS) in a handover procedure.

According to another embodiment of the present, a method performed by a first network node in a wireless communication system is provided. The method may comprise: receiving information on a first cell and a second cell which is related to the first cell from a second network node; transmitting a measurement configuration including the information on the first cell and the second cell to a user equipment (UE); receiving a measurement result of the first cell and the second cell from the UE; and transmitting the measurement result to the second network node.

The first cell may provide a first uplink (UL) carrier and a first downlink (DL) carrier, and the second cell may provide a second UL carrier.

The measurement configuration may inform the UE that the result of the measurement on the second cell needs to be reported with the result of the measurement on the first cell.

The first cell may be a specific cell among at least one of cells managed by a secondary node (SN), and the second cell may be a supplementary uplink (SUL) cell managed by the SN for the first cell in a secondary node addition procedure, and wherein the first network node may be master node (MN) and the second network node may be the SN in the secondary node addition procedure.

The first cell may be a specific cell among at least one of cells managed by a target base station (BS), and the second cell is a supplementary uplink (SUL) cell managed by the target BS for the first cell in a handover procedure, and wherein the first network node may be a source BS and the second network node may be the target BS in the handover procedure.

According to another embodiment of the present invention, a user equipment (UE) in a wireless communication system is provided. The UE may comprise: a transceiver for transmitting or receiving a radio signal; and a processor coupled to the transceiver, the processor configured to: control the transceiver to receive a measurement configuration including information on a first cell and a second cell which is related to the first cell; perform measurement on the first cell and the second cell; and control the transceiver to transmit a result of the measurement on the first cell and the second cell, when a reporting of measurement on the first cell is triggered.

According to embodiments of the present invention, how to notify the UE that SUL is supported in target cell or secondary node (SN), so that the UE may perform measurement on the target cell in handover procedure or measurement the SN in SN addition procedure.

DETAILED DESCRIPTION

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (DL). For example, only OFDMA may be used for DL and only SC-FDMA may be used for UL. Alternatively, OFDMA and SC-FDMA may be used for DL and/or UL.

Figure 1:
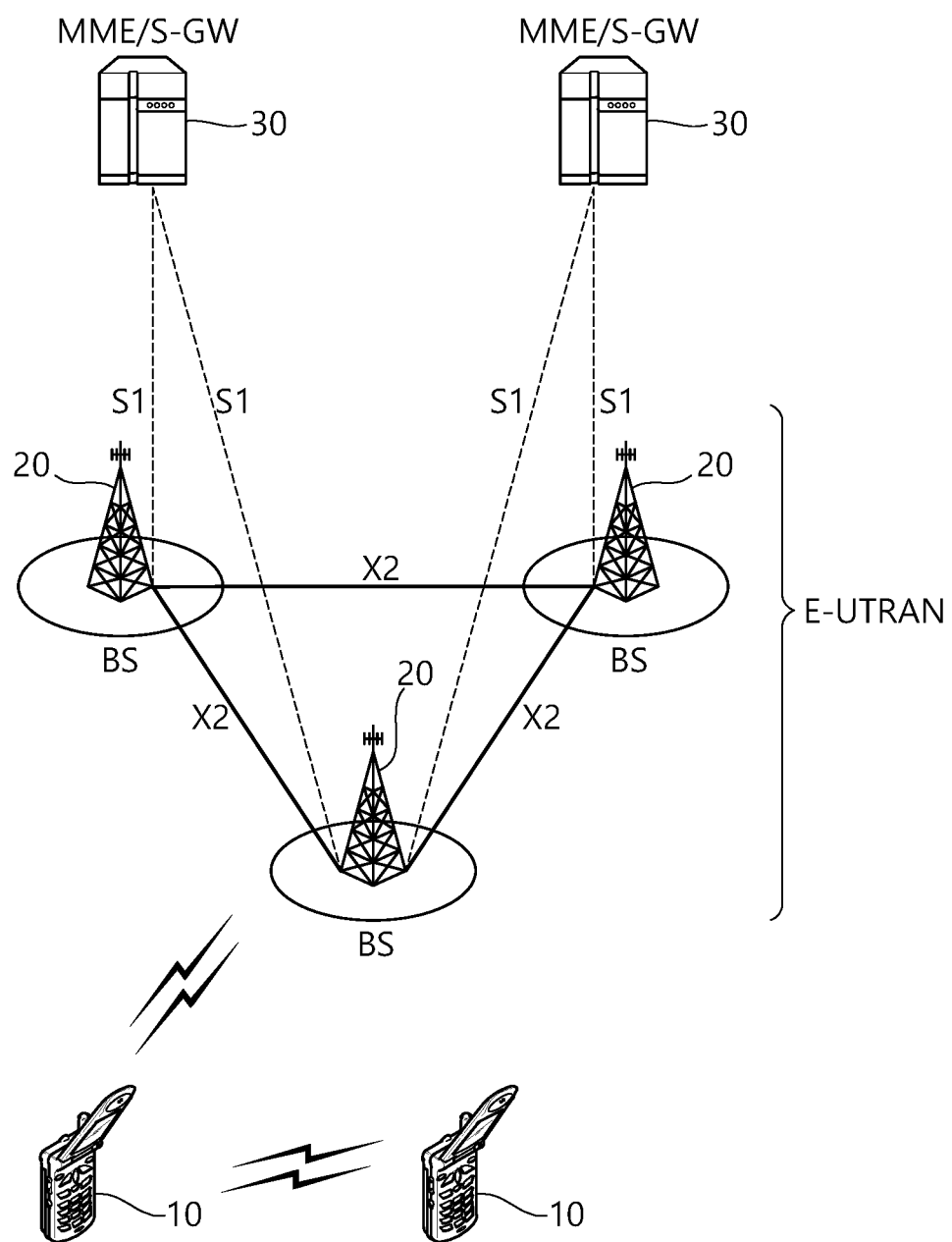
FIG. 1 shows an example of a wireless communication system to which technical features of the present invention can be applied.

FIG. 1 shows an example of a wireless communication system to which technical features of the present invention can be applied. Specifically, FIG. 1 shows a system architecture based on an evolved-UMTS terrestrial radio access network (E-UTRAN). The aforementioned LTE is a part of an evolved-UTMS (e-UMTS) using the E-UTRAN.

Referring to FIG. 1, the wireless communication system includes one or more user equipment (UE; 10), an E-UTRAN and an evolved packet core (EPC). The UE 10 refers to a communication equipment carried by a user. The UE 10 may be fixed or mobile. The UE 10 may be referred to as another terminology, such as a mobile station (MS), a user terminal (UT), a subscriber station (SS), a wireless device, etc.

The E-UTRAN consists of one or more base station (BS) 20. The BS 20 provides the E-UTRA user plane and control plane protocol terminations towards the UE 10. The BS 20 is generally a fixed station that communicates with the UE 10. The BS 20 hosts the functions, such as inter-cell radio resource management (MME), radio bearer (RB) control, connection mobility control, radio admission control, measurement configuration/provision, dynamic resource allocation (scheduler), etc. The BS may be referred to as another terminology, such as an evolved NodeB (eNB), a base transceiver system (BTS), an access point (AP), etc.

A downlink (DL) denotes communication from the BS 20 to the UE 10. An uplink (UL) denotes communication from the UE 10 to the BS 20. A sidelink (SL) denotes communication between the UEs 10. In the DL, a transmitter may be a part of the BS 20, and a receiver may be a part of the UE 10. In the UL, the transmitter may be a part of the UE 10, and the receiver may be a part of the BS 20. In the SL, the transmitter and receiver may be a part of the UE 10.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 30 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 10 is connected to the BS 20 by means of the Uu interface. The UEs 10 are interconnected with each other by means of the PC5 interface. The BSs 20 are interconnected with each other by means of the X2 interface. The BSs 20 are also connected by means of the S1 interface to the EPC, more specifically to the MME by means of the S1-MME interface and to the S-GW by means of the S1-U interface. The S1 interface supports a many-to-many relation between MMEs/S-GWs and BSs.

Figure 2:
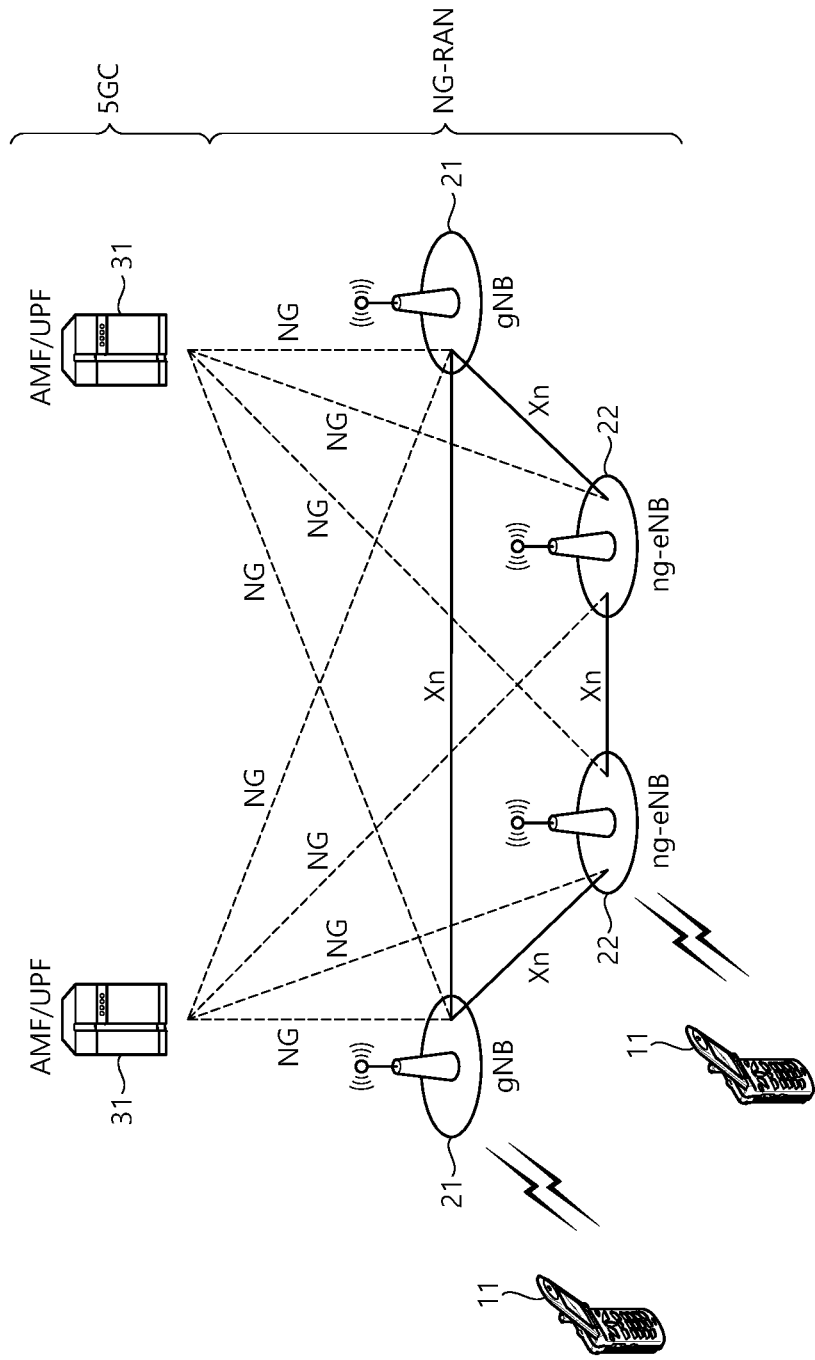
FIG. 2 shows another example of a wireless communication system to which technical features of the present invention can be applied.

FIG. 2 shows another example of a wireless communication system to which technical features of the present invention can be applied. Specifically, FIG. 2 shows a system architecture based on a 5G new radio access technology (NR) system. The entity used in the 5G NR system (hereinafter, simply referred to as "NR") may absorb some or all of the functions of the entities introduced in FIG. 1 (e.g. eNB, MME, S-GW). The entity used in the NR system may be identified by the name "NG" for distinction from the LTE/LTE-A.

Referring to FIG. 2, the wireless communication system includes one or more UE 11, a next-generation RAN (NG-RAN) and a $5^{th}$ generation core network (5GC). The NG-RAN consists of at least one NG-RAN node. The NG-RAN node is an entity corresponding to the BS 10 shown in FIG. 1. The NG-RAN node consists of at least one gNB 21 and/or at least one ng-eNB 22. The gNB 21 provides NR user plane and control plane protocol terminations towards the UE 11.

The ng-eNB 22 provides E-UTRA user plane and control plane protocol terminations towards the UE 11.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs and ng-eNBs are interconnected with each other by means of the Xn interface. The gNBs and ng-eNBs are also connected by means of the NG interfaces to the 5GC, more specifically to the AMF by means of the NG-C interface and to the UPF by means of the NG-U interface.

A protocol structure between network entities described above is described. On the system of FIG. 1 and/or FIG. 2, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

Figure 3:
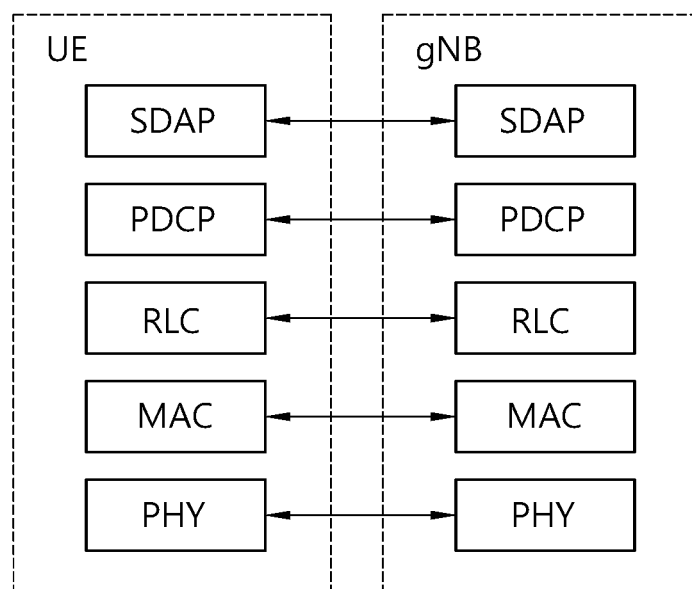
FIG. 3 shows a block diagram of a user plane protocol stack to which technical features of the present invention can be applied.
Figure 4:
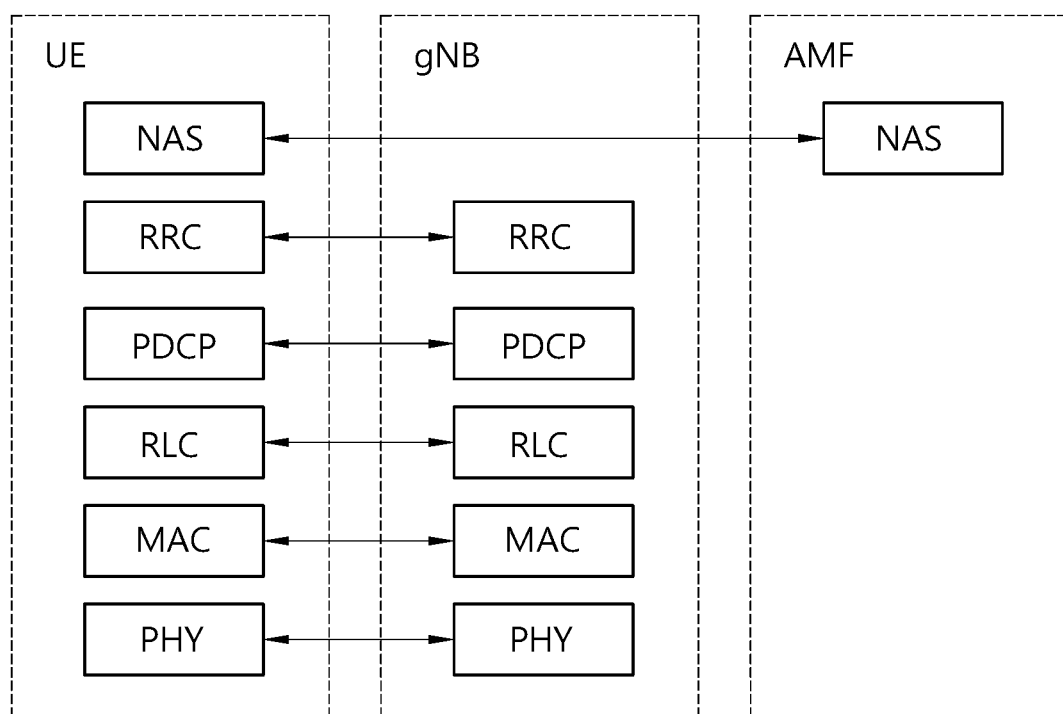
FIG. 4 shows a block diagram of a control plane protocol stack to which technical features of the present invention can be applied.

FIG. 3 shows a block diagram of a user plane protocol stack to which technical features of the present invention can be applied. FIG. 4 shows a block diagram of a control plane protocol stack to which technical features of the present invention can be applied. The user/control plane protocol stacks shown in FIG. 3 and FIG. 4 are used in NR. However, user/control plane protocol stacks shown in FIG. 3 and FIG. 4 may be used in LTE/LTE-A without loss of generality, by replacing gNB/AMF with eNB/MME.

Referring to FIG. 3 and FIG. 4, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/demultiplexing of MAC service data units (SDUs) belonging to one or different logical channels into/from transport blocks (TB) delivered to/from the physical layer on transport channels, scheduling information reporting, error correction through hybrid automatic repeat request (HARQ), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the base station.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

The physical channels may be modulated according to OFDM processing and utilizes time and frequency as radio resources. The physical channels consist of a plurality of orthogonal frequency division multiplexing (OFDM) symbols in time domain and a plurality of subcarriers in frequency domain. One subframe consists of a plurality of OFDM symbols in the time domain. A resource block is a resource allocation unit, and consists of a plurality of OFDM symbols and a plurality of subcarriers. In addition, each subframe may use specific subcarriers of specific OFDM symbols (e.g. first OFDM symbol) of the corresponding subframe for a physical downlink control channel (PDCCH), i.e. L1/L2 control channel. A transmission time interval (TTI) is a basic unit of time used by a scheduler for resource allocation. The TTI may be defined in units of one or a plurality of slots, or may be defined in units of mini-slots.

The transport channels are classified according to how and with what characteristics data are transferred over the radio interface. DL transport channels include a broadcast channel (BCH) used for transmitting system information, a downlink shared channel (DL-SCH) used for transmitting user traffic or control signals, and a paging channel (PCH) used for paging a UE. UL transport channels include an uplink shared channel (UL-SCH) for transmitting user traffic or control signals and a random access channel (RACH) normally used for initial access to a cell.

Different kinds of data transfer services are offered by MAC sublayer. Each logical channel type is defined by what type of information is transferred. Logical channels are classified into two groups: control channels and traffic channels.

Control channels are used for the transfer of control plane information only. The control channels include a broadcast control channel (BCCH), a paging control channel (PCCH), a common control channel (CCCH) and a dedicated control channel (DCCH). The BCCH is a DL channel for broadcasting system control information. The PCCH is DL channel that transfers paging information, system information change notifications. The CCCH is a channel for transmitting control information between UEs and network. This channel is used for UEs having no RRC connection with the network. The DCCH is a point-to-point bi-directional channel that transmits dedicated control information between a UE and the network. This channel is used by UEs having an RRC connection.

Traffic channels are used for the transfer of user plane information only. The traffic channels include a dedicated traffic channel (DTCH). The DTCH is a point-to-point channel, dedicated to one UE, for the transfer of user information. The DTCH can exist in both UL and DL.

Regarding mapping between the logical channels and transport channels, in DL, BCCH can be mapped to BCH, BCCH can be mapped to DL-SCH, PCCH can be mapped to PCH, CCCH can be mapped to DL-SCH, DCCH can be mapped to DL-SCH, and DTCH can be mapped to DL-SCH. In UL, CCCH can be mapped to UL-SCH, DCCH can be mapped to UL-SCH, and DTCH can be mapped to UL-SCH.

Multi-RAT Dual Connectivity (MR-DC) is a generalization of the Intra-E-UTRA Dual Connectivity (DC), where a multiple Rx/Tx UE may be configured to utilise resources provided by two different nodes connected via non-ideal backhaul, one providing E-UTRA access and the other one providing NR access. One node acts as the MN and the other as the SN. The MN and SN are connected via a network interface and at least the MN is connected to the core network.

E-UTRAN supports MR-DC via E-UTRA-NR Dual Connectivity (EN-DC), in which a UE is connected to one eNB that acts as a MN and one en-gNB that acts as a SN. The eNB is connected to the EPC via the S1 interface and to the en-gNB via the X2 interface. The en-gNB might also be connected to the EPC via the S1-U interface and other en-gNBs via the X2-U interface.

NG-RAN supports NG-RAN E-UTRA-NR Dual Connectivity (NGEN-DC), in which a UE is connected to one ng-eNB that acts as a MN and one gNB that acts as a SN. The ng-eNB is connected to the 5GC and the gNB is connected to the ng-eNB via the Xn interface.

In EN-DC, at initial connection establishment SRB1 uses E-UTRA PDCP. After initial connection establishment MCG SRBs (SRB1 and SRB2) can be configured by the network to use either E-UTRA PDCP or NR PDCP. A PDCP version change (release of old PDCP and establish of new PDCP) of SRBs can be supported in either direction (i.e. from E-UTRA PDCP to NR PDCP or vice versa) via a handover procedure (reconfiguration with mobility) or, for the initial change from E-UTRA PDCP to NR PDCP, with a reconfiguration without mobility, when the network knows there is no UL data in buffer and before the initial security activation. For EN-DC capable UEs, NR PDCP can be configured for DRBs and SRBs also before EN-DC is configured.

If the SN is a gNB (i.e. for EN-DC and NGEN-DC), the UE can be configured to establish a SRB with the SN (SRB3) to enable RRC PDUs for the SN to be sent directly between the UE and the SN. RRC PDUs for the SN can only be transported directly to the UE for SN RRC reconfiguration not requiring any coordination with the MN. Measurement reporting for mobility within the SN can be done directly from the UE to the SN if SRB3 is configured.

Hereinafter, secondary node addition procedure is described. The Secondary Node Addition procedure is initiated by the MN and is used to establish a UE context at the SN to provide radio resources from the SN to the UE. This procedure is used to add at least the first cell of the SCG.

Figure 5:
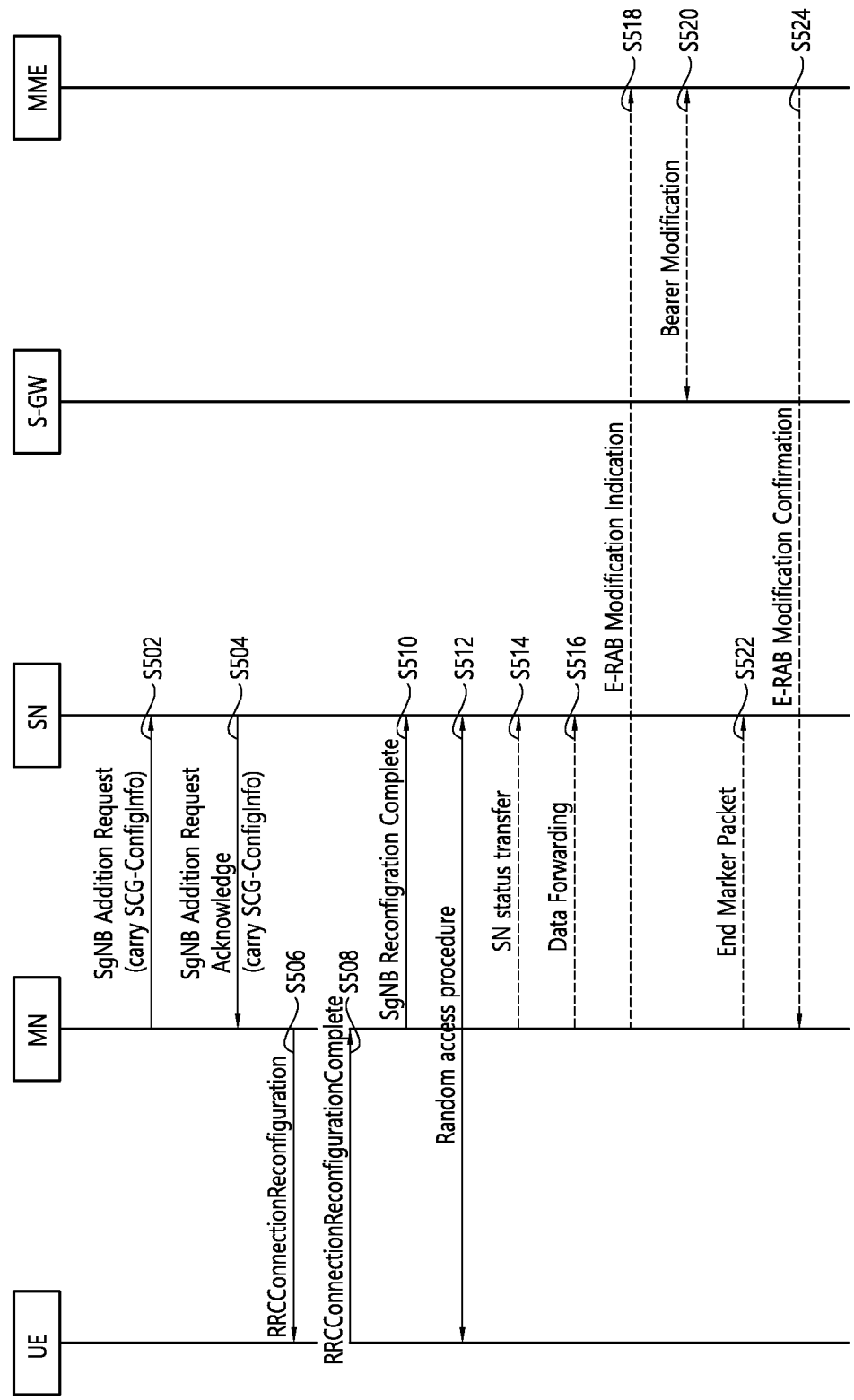
FIG. 5 illustrates secondary node addition procedure.

FIG. 5 illustrates secondary node addition procedure.

In step S502, the MN decides to request the SN to allocate radio resources for a specific E-RAB, indicating E-RAB characteristics (E-RAB parameters, TNL address information corresponding to bearer type). In addition, MN indicates the requested SCG configuration information, including the entire UE capabilities and the UE capability coordination result. The MN provides the latest measurement results for SN to choose and configure the SCG cell(s). The MN may request the SN to allocate radio resources for MCG split SRB operation. Addition of SRB3 is decided by the SN. In case of SCG Split bearer, the MN provides X2 DL TNL address information for the respective E-RAB and also the maximum QoS level that it can support. The SN may reject the request.

In contrast to SCG bearer and the SCG Split bearer, for the MCG split bearer option the MN may either decide to request resources from the SN of such an amount, that the QoS for the respective E-RAB is guaranteed by the exact sum of resources provided by the MN and the SN together, or even more. The MNs decision may be reflected in step S502 by the E-RAB parameters signalled to the SN, which may differ from E-RAB parameters received over S1.

For a specific E-RAB, the MN may request the direct establishment of an SCG or a MCG/SCG Split bearer, i.e., without first having to establish an MCG bearer.

In step S504, if the RRM entity in the SN is able to admit the resource request, it allocates respective radio resources and, dependent on the bearer option, respective transport network resources. The SN triggers Random Access so that synchronisation of the SN radio resource configuration can be performed. The SN decides the Pscell and other SCG Scells and provides the new SCG radio resource configuration to the MN in a NR RRC configuration message contained in the SgNB Addition Request Acknowledge message. For SCG bearers and SCG split bearers, the SN provides the new SCG radio resource configuration together with S1 DL TNL address information for the respective E-RAB and security algorithm, for MCG split bearers together with X2 DL TNL address information. For SCG split bearer, the SN provides also X2 UL TNL address information for respective E-RAB and the radio configuration that does not exceed the QoS level signalled in step S502.

For the SCG split bearer option, the SN may either decide to request resources from the MN of such an amount, that the QoS for the respective E-RAB is guaranteed by the exact sum of resources provided by the MN and the SN together, or even more. The SNs decision may be reflected in step S504 by the E-RAB parameters signalled to the MN, which may differ from E-RAB parameters received in step S502. The QoS level requested from the MN shall not exceed the level that the MN offered when setting up the SCG split bearer in step S502.

In case of MCG split bearers, transmission of user plane data may take place after step S504.

In case of SCG bearers and SCG split bearers, data forwarding and the SN Status Transfer may take place after step S504.

In step S506, the MN sends to the UE the RRCConnectionReconfiguration message including the NR RRC configuration message, without modifying it.

In step S508, the UE applies the new configuration and replies to MN with RRCConnectionReconfigurationComplete message, including a NR RRC response message. In case the UE is unable to comply with (part of) the configuration included in the RRCConnectionReconfiguration message, it performs the reconfiguration failure procedure.

In step S510, the MN informs the SN that the UE has completed the reconfiguration procedure successfully via SgNB ReconfigurationComplete message, including the encoded NR RRC response message.

In step S512, the UE performs synchronisation towards the PSCell of the SN. The order the UE sends the RRCConnectionReconfigurationComplete message and performs the Random Access procedure towards the SCG is not defined. The successful RA procedure towards the SCG is not required for a successful completion of the RRC Connection Reconfiguration procedure.

In step S514 and S516, in case of SCG bearers and SCG Split bearers, and dependent on the bearer characteristics of the respective E-RAB, the MN may take actions to minimise service interruption due to activation of EN-DC (Data forwarding, SN Status Transfer).

In step S518-S524, for SCG bearers and SCG Split bearers, the update of the UP path towards the EPC is performed.

In EN-DC, UE may be configured with at least LTE MN PCell and NR SN PSCell. The SN may trigger Random Access for SN addition, so that synchronization of the SN radio resource configuration can be performed. The SN may decide the PScell and other SCG Scells and may provide the new SCG radio resource configuration to the MN in a NR RRC configuration message contained in the SgNB Addition Request Acknowledge message. The UE may perform synchronization towards the PSCell of the SN by performing the Random Access procedure towards the SCG.

Hereinafter, handover procedure is described. Network controlled mobility applies to UEs in RRC_CONNECTED and is categorized into two types of mobility: cell level mobility and beam level mobility. The cell Level Mobility requires explicit RRC signalling to be triggered, i.e. handover. The beam Level Mobility does not require explicit RRC signalling to be triggered, which is dealt with at lower layers, and RRC is not required to know which beam is being used at a given point in time.

Figure 6:
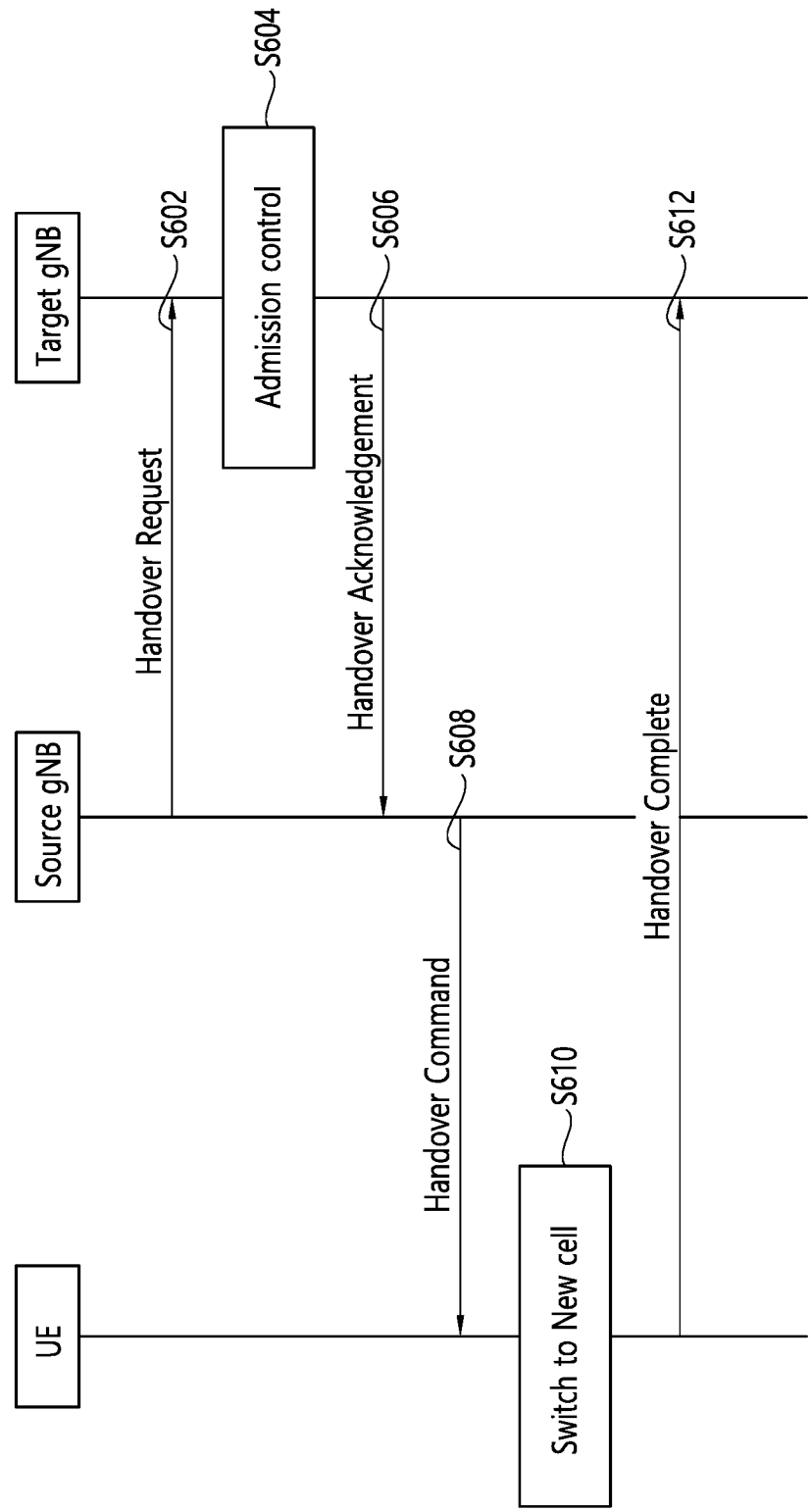
FIG. 6 illustrates handover procedure.

FIG. 6 illustrates handover procedure.

In step S602, the source gNB initiates handover and issues a Handover Request over the Xn interface.

In step S604, the target gNB performs admission control and provides the RRC configuration as part of the Handover Acknowledgement.

In step S606, the source gNB provides the RRC configuration to the UE in the Handover Command. The Handover Command message includes at least cell ID and all information required to access the target cell so that the UE can access the target cell without reading system information. For some cases, the information required for contention based and contention free random access can be included in the Handover Command message. The access information to the target cell may include beam specific information, if any.

In step S608, the UE moves the RRC connection to the target gNB and replies the Handover Complete.

In NR, Supplementary Uplink (SUL) is introduced for enhancing UL coverage. In case of SUL, the UE may be configured with 2 ULs for one DL of a same cell, and uplink transmissions on those two ULs are controlled by the network to avoid overlapping PUSCH transmissions in time. Thus, initial access may be supported in each of the uplink. For initial access in a NR cell configured with SUL, the UE may select the SUL carrier if and only if the measured quality of the DL is lower than a broadcast threshold. Once started, all uplink transmissions of the random access procedure remain on the selected carrier.

Figure 7:
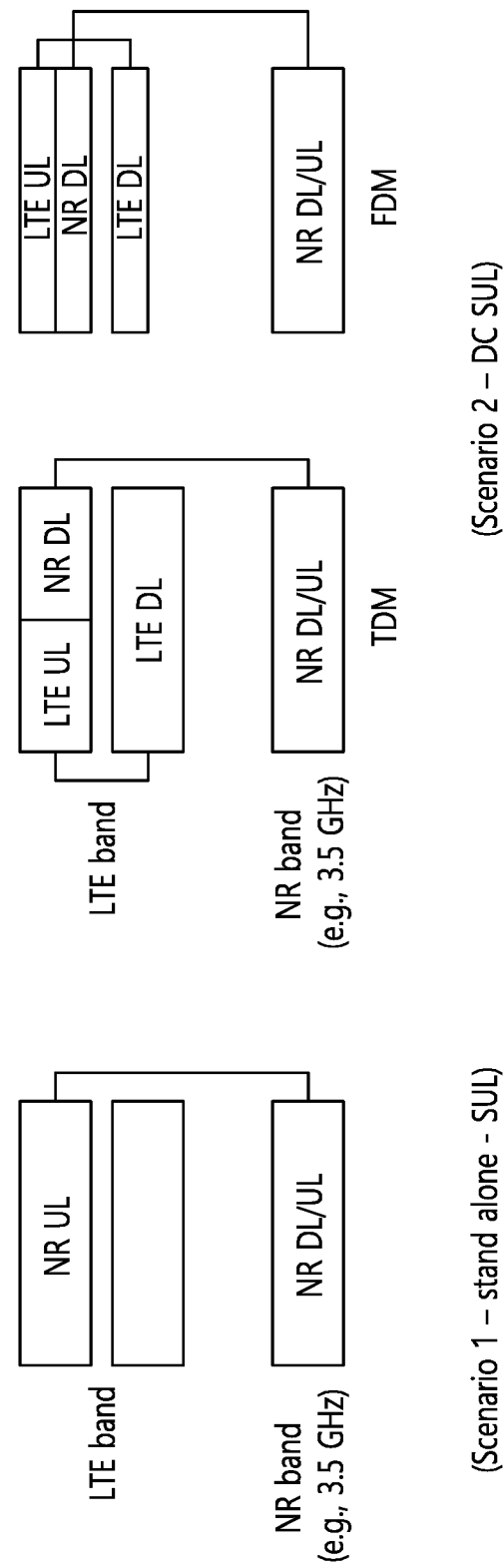
FIG. 7 shows scenarios for SUL.

FIG. 7 shows scenarios for SUL. Referring to FIG. 7, Up to 2 UL carriers are configurable per each DL carrier in a cell. The PUCCH is semi-statically configured between non-SUL and SUL in PCell if SUL is configured. The PUSCH can be dynamically switched between non-SUL and SUL if configured. No simultaneous PUSCH transmission on both is allowed at the same time. SRS can be simultaneously transmitted on both UL carriers. The PDCCH order can indicate which UL to use for RACH transmission. The RACH procedure (contention) can select non-SUL or SUL PRACH resource depending on RSRP.

In SN addition, when SN is added, UE could be configured with 2 ULs for one DL of PSCell. For example, when UE is configured with one DL carrier of PSCell in high frequency, UE may be also configured with both one UL carrier in low frequency and one UL carrier in high frequency for the DL carrier of PSCell. Then, UE should perform random access at one of two uplink carriers. In handover, UE in NR RRC_CONNECTED may perform handover from NR source cell to NR target cell. However, the UE does not have any information on SUL carriers.

For initial access, UE in RRC_IDLE may select the SUL carrier by evaluating the quality of the serving DL carrier e.g. in high frequency with the threshold, because it is difficult for UE in RRC_IDLE to measure qualities of two carriers associated to 2 ULs (e.g. in high and low frequencies). However, applying the SUL procedure of initial access to SN addition of EN-DC seems not so optimal for UE in RRC_CONNECTED.

Hereinafter, a method for according to an embodiment of the present invention is described. According to an embodiment of the present invention, the UE may receive measurement configuration from the network. The measurement configuration may indicate measurement on the frequency of the first cell with reporting of the measured result of the second cell associated with the first cell. If measurement reporting is triggered due to the first cell, UE may report measured result of the first cell with measured result of the second cell associated with the first cell. In other words, the UE may perform measurement on both the first cell and the second cell which are indicated by the measurement configuration. Further, the UE may report not only the measured result of the first cell, but also the measured result of the second cell to the network, even when only condition of measurement reporting for the first cell is satisfied.

In an embodiment of the present invention, it is assumed that one cell is associated with one DL carrier and two UL carriers from UE perspective. Thus, UE may be configured with one DL carrier and two UL carriers for SUL operation of one serving cell.

The network may manage at least two cells on different carriers. The first cell may have the first DL carrier and the first UL carrier e.g. in higher frequency. The second cell may have the second DL carrier and the second UL carrier e.g. in lower frequency. When a UE is served by the first cell, the first cell may provide UE with the first DL carrier, the first UL carrier and the second UL carrier. Thus, the UE may be configured with one DL carrier (i.e. the first DL carrier) and two UL carriers (i.e. the first UL carrier and the second UL carrier) for one serving cell (i.e. for the first cell) to perform SUL operation.

The second UL carrier may be considered as SUL carriers. The second cell may be called as the SUL reference cell of the first cell for the UE. The second UL carrier may be called as the SUL reference carrier of the first cell for the UE. The network may configure a UE with measurements on the first DL carrier and the second DL carrier for the UE to report the quality of the first cell together with the quality of the second cell (i.e. the SUL reference cell of the first cell). When measurement reporting is triggered for the first cell, UE may report the quality of the first cell together with the quality of the second cell (i.e. the SUL reference cell of the first cell).

According to embodiments of the present invention, a method for reporting measurement result of the first cell and the second cell may be applied to secondary node addition procedure and handover procedure.

Figure 8:
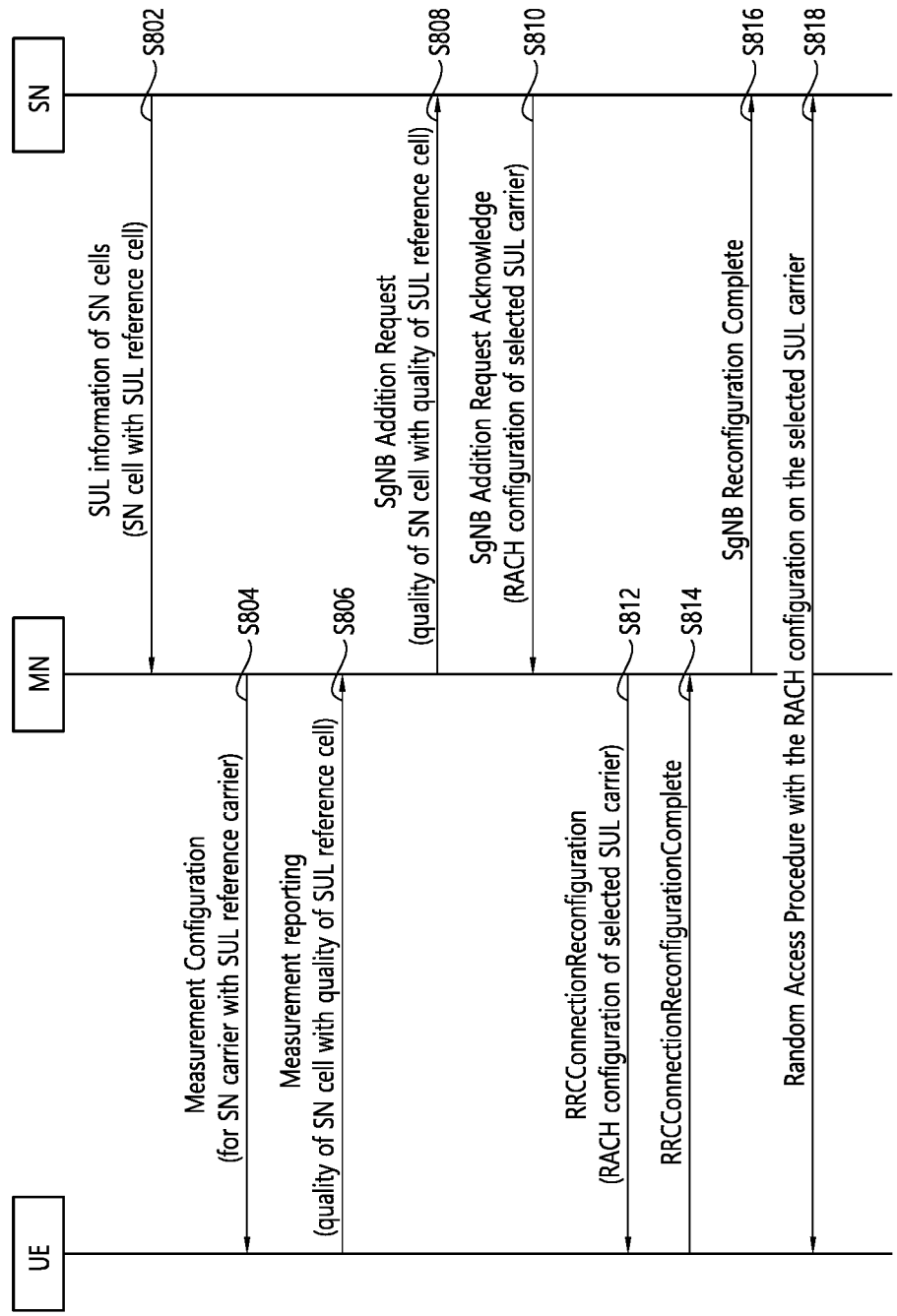
FIG. 8 shows a method for reporting measurement result in secondary node addition procedure according to an embodiment of the present invention.

FIG. 8 shows a method for reporting measurement result in secondary node addition procedure according to an embodiment of the present invention. In this embodiment, the secondary node (SN) may support supplementary uplink (SUL). Specifically, the SN may manage at least one SN cell and at least one SUL reference cell for the SN cell. The SN cell may be the first cell described above, and the SUL reference cell may be the second cell described above. That is, the SN cell may provide the first UL carrier and the first DL carrier, the SUL reference cell may provide the second UL carrier. The SN cell may be a specific cell among cells managed by the SN, and the SUL reference cell may be a cell which is used as SUL cell for the SN cell.

In step S802, the SN may inform MN about SUL information of SN cells managed by SN. The SUL information may indicate that cells managed by the SN support SUL. The SUL information of SN cells may include information on the SN cell (e.g. Cell ID and the UL/DL frequency of the SN cell) and information of a SUL reference cell for the SN cell (e.g. Cell ID and the UL/DL frequency of the SUL reference cell).

In step S804, the MN may send measurement configuration to the UE. The measurement configuration may include at least one SN carrier as the Measurement Object. In the measurement configuration, the SUL reference carrier of the SN carrier may be indicated to the UE. The SN carrier may be carrier provided by the SN cell, and the SUL reference carrier of SN carrier may be carrier provided by the SUL reference cell. Upon receiving the measurement configuration, the UE may measure the included SN carrier and the indicated SUL reference carrier of the SN carrier/cell. In this step, the UE may be also configured with reporting configuration. The reporting configuration may indicate the SN cell, the SUL reference cell of the SN cell, and the SUL reference carrier of the SN cell. The reporting configuration may also indicate event-triggered measurement reporting e.g. A1-A6 event or periodic reporting.

In step S806, if measurement reporting is triggered for the SN cell e.g. due to A1-A6 event or periodically, the UE may send measurement reporting message to the MN. For that, the UE may perform measurement on the included SN cell and the indicated SUL reference cell for the SN cell. Upon measuring, the UE may include the measured quality of the included SN cell and the measured quality of the indicated SUL reference cell for the SN cell in the measurement reporting message.

In step S808, the MN may decide to request the SN to allocate radio resources for a specific E-RAB, indicating E-RAB characteristics (E-RAB parameters, TNL address information corresponding to bearer type). In addition, the MN may indicate the requested SCG configuration information, including the entire UE capabilities and the UE capability coordination result. The MN may provide the latest measurement results for SN to choose and configure the SCG cell(s). The latest measurement results may include the measured quality of the included SN cell and the measured quality of the indicated SUL reference cell for the SN cell. The MN can also select a SUL carrier of the SN cell and indicate the SUL carrier of the SN cell to the SN.

The MN may request the SN to allocate radio resources for MCG split SRB operation. Addition of SRB3 is decided by the SN. In case of SCG Split bearer, the MN may provide X2 DL TNL address information for the respective E-RAB and also the maximum QoS level that it can support. The SN may reject the request.

In contrast to SCG bearer and the SCG Split bearer, for the MCG split bearer option, the MN may either decide to request resources from the SN of such an amount, that the QoS for the respective E-RAB is guaranteed by the exact sum of resources provided by the MN and the SN together, or even more. The decision performed at MN may be reflected in step S802 by the E-RAB parameters signaled to the SN, which may differ from E-RAB parameters received over S1. For a specific E-RAB, the MN may request the direct establishment of an SCG or a MCG/SCG Split bearer, i.e., without first having to establish an MCG bearer.

In step S810, based on the latest measurement results on SN cells, the SN may select a PSCell among the SN cells. The SN also may select a SUL carrier of the selected PSCell between two SUL carriers of the selected PSCell, based on the measured result of the PSCell, the measured result of the SUL reference cell of the PSCell, and congestion of two SUL carriers. For example, if the measured result of the PSCell is better than the measured result of the SUL reference cell of the PSCell, the SN may select the first UL carrier (e.g. PSCell). Otherwise, the SN may select the second UL carrier (e.g. SUL reference cell of the PSCell).

If the RRM entity in the SN is able to admit the resource request, it may allocate respective radio resources and, dependent on the bearer option, respective transport network resources. The SN may trigger Random Access so that synchronisation of the SN radio resource configuration can be performed. The SN may decide the PScell, other SCG Scells and a RACH configuration of the selected SUL carrier, and provide the new SCG radio resource configuration including the selected SUL carrier and the RACH configuration of the selected SUL carrier to the MN in a NR RRC configuration message contained in the SgNB Addition Request Acknowledge message. For SCG bearers and SCG split bearers, the SN may provide the new SCG radio resource configuration together with S1 DL TNL address information for the respective E-RAB and security algorithm, for MCG split bearers together with X2 DL TNL address information. For SCG split bearer, the SN may provide also X2 UL TNL address information for respective E-RAB and the radio configuration that does not exceed the QoS level signaled in step S802.

For the SCG split bearer option, the SN may either decide to request resources from the MN of such an amount, that the QoS for the respective E-RAB is guaranteed by the exact sum of resources provided by the MN and the SN together, or even more. The SNs decision may be reflected in step 2 by the E-RAB parameters signalled to the MN, which may differ from E-RAB parameters received in step S802. The QoS level requested from the MN shall not exceed the level that the MN offered when setting up the SCG split bearer in step 1.

In case of MCG split bearers, transmission of user plane data may take place after step S804. In case of SCG bearers and SCG split bearers, data forwarding and the SN Status Transfer may take place after step S804.

In step S812, the MN may send to the UE the RRCConnectionReconfiguration message including the NR RRC configuration message, without modifying it. The RRCConnectionReconfiguration message may include the selected SUL carrier and the RACH configuration of the selected SUL carrier for the PSCell.

In step S814, the UE may apply the new configuration and replies to MN with RRCConnectionReconfigurationComplete message, including a NR RRC response message. In case the UE is unable to comply with (part of) the configuration included in the RRCConnectionReconfiguration message, it may perform the reconfiguration failure procedure.

In step S816, the MN may inform the SN that the UE has completed the reconfiguration procedure successfully via SgNB ReconfigurationComplete message, including the encoded NR RRC response message.

In step S818, the UE may perform synchronisation towards the PSCell of the SN. The UE may perform the Random Access procedure on the selected SUL carrier with the included RACH configuration. The order the UE sends the RRCConnectionReconfigurationComplete message and performs the Random Access procedure towards the SCG may not be defined. The successful RA procedure towards the SCG may not be required for a successful completion of the RRC Connection Reconfiguration procedure.

If the SN addition fails, UE may send SCG failure information to the MN. The SCG failure information may include the measured result of the SUL reference cell of the PSCell.

Figure 9:
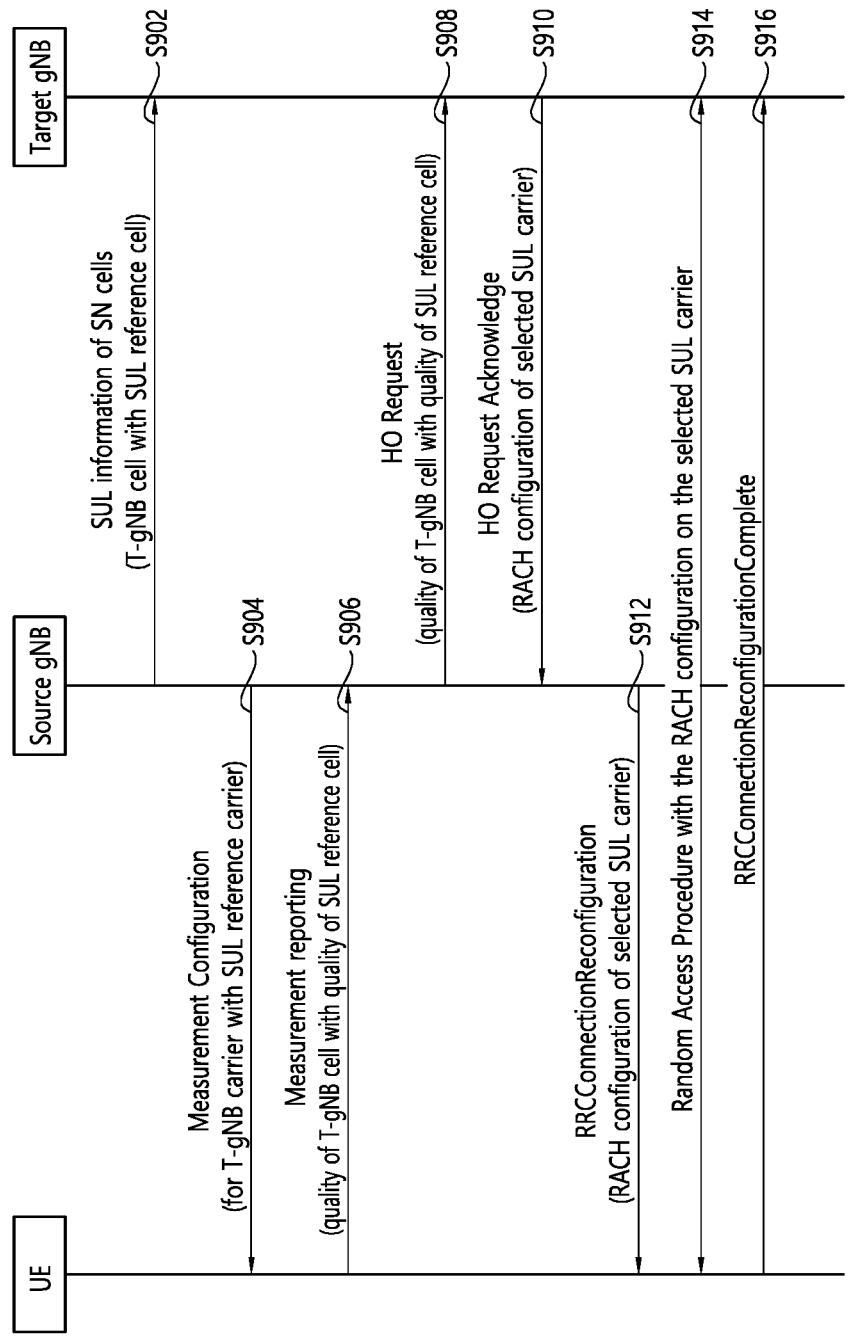
FIG. 9 shows a method for reporting measurement result in handover procedure according to an embodiment of the present invention.

FIG. 9 shows a method for reporting measurement result in handover procedure according to an embodiment of the present invention. In this embodiment, the target gNB of the handover procedure may support supplementary uplink (SUL). Specifically, the target gNB may manage at least one target cell and at least one SUL reference cell for the target cell. The target cell may be the first cell described above, and the SUL reference cell may be the second cell described above. That is, the target cell may provide the first UL carrier and the first DL carrier, the SUL reference cell may provide the second UL carrier. The target cell may be a specific cell among cells managed by the target gNB, and the SUL reference cell may be a cell which is used as SUL cell for the target cell.

In step S902, the target gNB may inform the source gNB about SUL information of target cells managed by target gNB. The SUL information may indicate that the target cell supports SUL. The SUL information of a target cell may include information on the target cell (e.g. Cell ID and the UL/DL frequency of the target cell) and information of a SUL reference cell for the target cell (e.g. Cell ID and the UL/DL frequency of the SUL reference cell).

In step S904, the source gNB may configure the UE measurement procedures with measurement configuration. The measurement configuration may include at least one target gNB carrier as the Measurement Object. In the measurement configuration, the SUL reference carrier of the target gNB carrier is indicated to the UE. The target gNB carrier may be provided by the target cell (e.g. first cell), and the SUL reference carrier of target gNB carrier may be carrier provided by the SUL reference cell (e.g. second cell). Upon receiving the measurement configuration, UE may measure the included target gNB carrier and the indicated SUL reference carrier of the target gNB carrier/cell.

In this step, UE may be also configured with reporting configuration. The reporting configuration may indicate the target cell, the SUL reference cell of the target cell, and the SUL reference carrier of the target cell. The reporting configuration also indicates event-triggered measurement reporting e.g. A1-A6 event or periodic reporting.

In step S906, if measurement reporting is triggered for the target cell e.g. due to A1-A6 event or periodically, UE may send measurement reporting message to the MN according to the configuration. The UE may include the measured quality of the included target cell and the measured quality of the indicated SUL reference cell for the target cell in the measurement reporting message. The source gNB may decide to handover the UE, based on MEASUREMENT REPORT and RRM information.

In step S908, the source gNB may issue a HANDOVER REQUEST message to the target gNB passing a transparent RRC container with necessary information to prepare the handover at the target side. The information may include at least the target cell ID, KgNB*, the C-RNTI of the UE in the source gNB, RRM-configuration including UE inactive time, basic AS-configuration including antenna Info and DL Carrier Frequency (subject to RAN1 feedback), the UE capabilities for different RATs, and can include the UE reported measurement information including beam-related information if available. Also, if CA is configured, the RRM configuration can include the list of best cells on each frequency for which measurement information is available and the list of best SUL carriers of the listed cells on each frequency. If SUL is configured, the RRM configuration can also include the measured quality of the included target cell and the measured quality of the indicated SUL reference cell for the target cell. The source gNB can also select a SUL carrier of the target gNB cell and indicate the SUL carrier of the target gNB cell to the target gNB.

In step S910, the target gNB may prepare the handover with L1/L2 and send the HANDOVER REQUEST ACKNOWLEDGE to the source gNB. The HANDOVER REQUEST ACKNOWLEDGE message may include a transparent container to be sent to the UE as an RRC message to perform the handover. The HANDOVER REQUEST ACKNOWLEDGE message also may include a SUL threshold, the selected SUL carrier and the RACH configuration of the selected SUL carrier.

In step S912, the source gNB may trigger the Uu handover and send the Handover Command message (i.e. RRC Connection Reconfiguration) to the UE. The Handover Command message may carry the information required to access the target cell, which includes at least the target cell ID, the new C-RNTI, the target gNB security algorithm identifiers for the selected security algorithms, can include a set of dedicated RACH resources, the association between RACH resources and SS blocks, the association between RACH resources and UE-specific CSI-RS configuration(s), common RACH resources, and target gNB SIBS, etc. The Handover Command message also may include the SUL threshold, the selected SUL carrier and the RACH configuration of the selected SUL carrier In step S914, the UE may synchronise to the target cell and perform random access procedure on the selected SUL carrier with the RACH configuration.

In step S916, the UE may send the RRC Connection Reconfiguration Complete message on the selected SUL carrier and complete the RRC handover procedure.

If the Handover procedure fails, the UE may initiate the RRC Connection Re-establishment procedure. In the RRC Connection Re-establishment, UE may select a cell and a SUL carrier of the cell. Then, UE may perform random access procedure on the selected SUL carrier to send the RRC Connection Re-establishment Request message towards the cell.

If the selected cell is the source cell, the UE may select the last SUL carrier of the source cell and perform RACH on the selected SUL carrier to send the RRC Connection Re-establishment Request message towards the cell.

If the selected cell is the target cell, the UE may use the selected SUL carrier of the target cell and perform RACH on the selected SUL carrier to send the RRC Connection Re-establishment Request message towards the cell.

Alternatively, if any cell is selected, the UE may measure the quality of the cell. If the measured quality is above the SUL threshold, the UE may select the first UL carrier as the SUL carrier. If the measured quality is equal to or below the SUL threshold, the UE may select the second UL carrier as the SUL carrier. The UE may perform RACH on the selected SUL carrier to send the RRC Connection Re-establishment Request message towards the cell.

Figure 10:
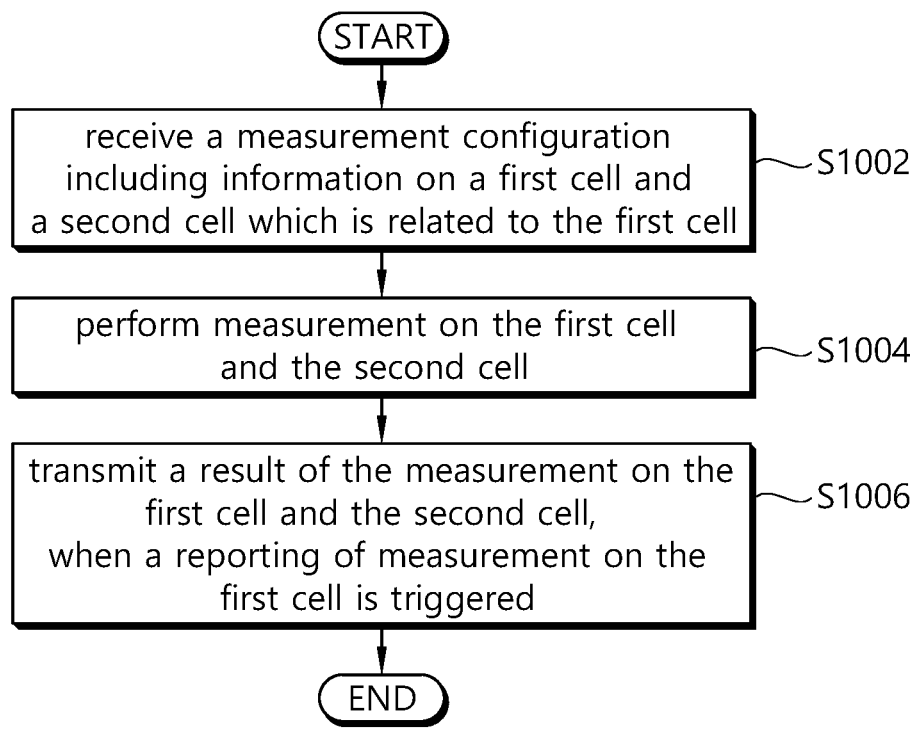
FIG. 10 shows an example of a method for reporting measurement result according to the present invention.

FIG. 10 shows an example of a method for reporting measurement result according to the present invention.

In step S1002, the UE may receive a measurement configuration including information on a first cell and a second cell which is related to the first cell. The first cell may provide a first uplink (UL) carrier and a first downlink (DL) carrier, and the second cell may provide a second UL carrier. A frequency of the first UL carrier may be higher than a frequency of the second UL carrier. The measurement configuration may inform the UE that the result of the measurement on the second cell needs to be reported with the result of the measurement on the first cell. The first cell may be a specific cell among at least one of cells managed by a secondary node (SN), and the second cell may be a supplementary uplink (SUL) cell managed by the SN for the first cell in a secondary node addition procedure. The first cell may be a specific cell among at least one of cells managed by a target base station (BS), and the second cell may be a supplementary uplink (SUL) cell managed by the target BS for the first cell in a handover procedure. The measurement configuration may include at least one of identity (ID) of the first cell, ID of the second cell, UL/DL carrier of the first cell and UL/DL carrier of the second cell.

In step S1004, the UE may perform measurement on the first cell and the second cell.

In step S1006, the UE may transmit a result of the measurement on the first cell and the second cell, when a reporting of measurement on the first cell is triggered. The result of the measurement on the first cell and the second cell may be transmitted to a master node (MN) in a secondary node addition procedure. The result of the measurement on the first cell and the second cell may be transmitted to a source base station (BS) in a handover procedure.

Figure 11:
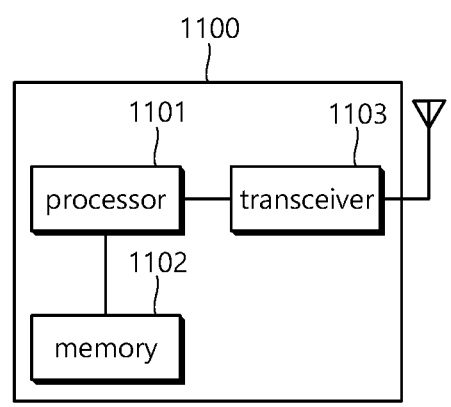
FIG. 11 shows a structure of UE according to an embodiment of the present invention.

FIG. 11 shows a structure of UE according to an embodiment of the present invention.

According to an embodiment of the present invention, the UE 1100 may comprise transceiver 1102, processor 1104 and memory 1106. The memory 1106 is coupled to the processor 1104, and stores a variety of information for driving the processor 1104. The transceiver 1102 is coupled to the processor 1104, and transmits and/or receives a radio signal. The processor 1104 implements the proposed functions, procedures, and/or methods. In the aforementioned embodiments, an operation of the UE 1100 may be implemented by the processor 1104.

The processor 1104 may include application-specific integrated circuit (ASIC), other chipset, logic circuit and/or data processing device. The memory 1106 may include read-only memory (ROM), random access memory (RAM), flash memory, memory card, storage medium and/or other storage device. The transceiver 1102 may include baseband circuitry to process radio frequency signals. When the embodiments are implemented in software, the techniques described herein can be implemented with modules (e.g., procedures, functions, and so on) that perform the functions described herein. The modules can be stored in memories and executed by processor 1104. The memory 1106 can be implemented within the processor 1104 or external to the processor 1104 in which case those can be communicatively coupled to the processor 1104 via various means as is known in the art.

The processor 1104 may control the transceiver 1102 to receive a measurement configuration including information on a first cell and a second cell which is related to the first cell. The first cell may provide a first uplink (UL) carrier and a first downlink (DL) carrier, and the second cell may provide a second UL carrier. A frequency of the first UL carrier may be higher than a frequency of the second UL carrier. The measurement configuration may inform the UE that the result of the measurement on the second cell needs to be reported with the result of the measurement on the first cell. The first cell may be a specific cell among at least one of cells managed by a secondary node (SN), and the second cell may be a supplementary uplink (SUL) cell managed by the SN for the first cell in a secondary node addition procedure. The first cell may be a specific cell among at least one of cells managed by a target base station (BS), and the second cell may be a supplementary uplink (SUL) cell managed by the target BS for the first cell in a handover procedure. The measurement configuration may include at least one of identity (ID) of the first cell, ID of the second cell, UL/DL carrier of the first cell and UL/DL carrier of the second cell.

The processor 1104 may perform measurement on the first cell and the second cell.

The processor 1104 may control the transceiver 1102 to transmit a result of the measurement on the first cell and the second cell, when a reporting of measurement on the first cell is triggered. The result of the measurement on the first cell and the second cell may be transmitted to a master node (MN) in a secondary node addition procedure. The result of the measurement on the first cell and the second cell may be transmitted to a source base station (BS) in a handover procedure.

Figure 12:
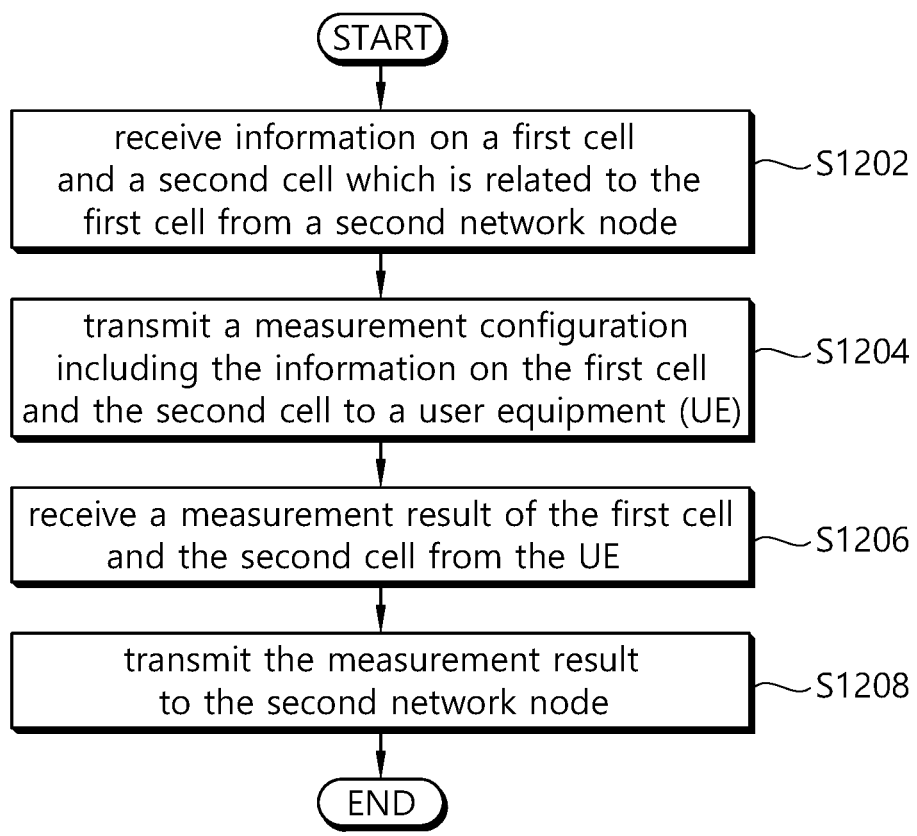
FIG. 12 shows an example of a method for reporting measurement result according to the present invention.

FIG. 12 shows an example of a method for reporting measurement result according to the present invention. The method described in this embodiment may be performed by a first network node. The first network node may be a master node (MN) and a second network node may be a secondary node (SN) in a secondary node addition procedure. Alternatively, the first network node may be a source BS and the second network node may be the target BS in the handover procedure.

In step S1202, the first network node may receive information on a first cell and a second cell which is related to the first cell from a second network node. The first cell may provide a first uplink (UL) carrier and a first downlink (DL) carrier, and the second cell may provide a second UL carrier. A frequency of the first UL carrier may be higher than a frequency of the second UL carrier. The measurement configuration may inform the UE that the result of the measurement on the second cell needs to be reported with the result of the measurement on the first cell. The first cell may be a specific cell among at least one of cells managed by a secondary node (SN), and the second cell may be a supplementary uplink (SUL) cell managed by the SN for the first cell in a secondary node addition procedure. The first cell may be a specific cell among at least one of cells managed by a target base station (BS), and the second cell may be a supplementary uplink (SUL) cell managed by the target BS for the first cell in a handover procedure. The measurement configuration may include at least one of identity (ID) of the first cell, ID of the second cell, UL/DL carrier of the first cell and UL/DL carrier of the second cell.

In step S1204, the first network node may transmit a measurement configuration including the information on the first cell and the second cell to a user equipment (UE).

In step S1206, the first network node may receive a measurement result of the first cell and the second cell from the UE.

In step S1208, the first network node may transmit the measurement result to the second network node.

Figure 13:
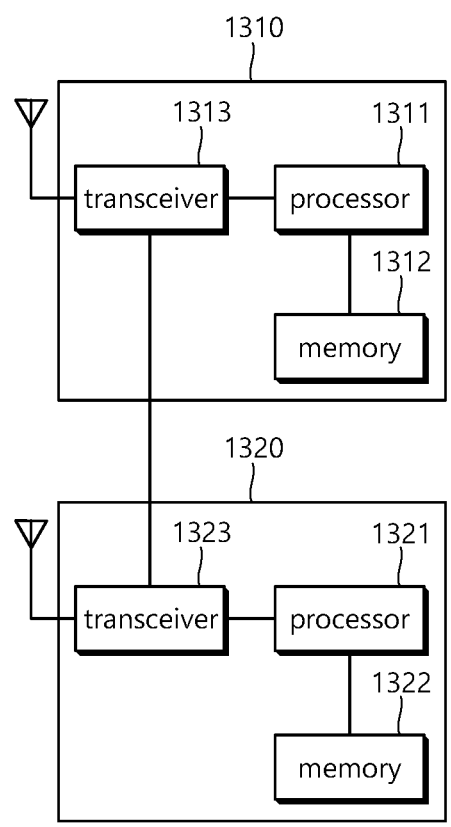
FIG. 13 shows a structure of network according to an embodiment of the present invention.

FIG. 13 shows a structure of network according to an embodiment of the present invention. In this embodiment, a first network node 1310 may be a master node (MN) and a second network node 1320 may be a secondary node (SN) in a secondary node addition procedure. Alternatively, the first network node 1310 may be a source BS and the second network node 1320 may be the target BS in the handover procedure.

A first network node 1310 includes a processor 1311, a memory 1312, and a transceiver 1313. The memory 1312 is coupled to the processor 1311, and stores a variety of information for driving the processor 1311. The transceiver 1313 is coupled to the processor 1311, and transmits and/or receives a radio signal. The processor 1311 implements the proposed functions, procedures, and/or methods. In the aforementioned embodiments, an operation of the first network node may be implemented by the processor 1311.

A second network node 1320 includes a processor 1321, a memory 1322, and a transceiver 1323. The memory 1322 is coupled to the processor 1321, and stores a variety of information for driving the processor 1321. The transceiver 1323 is coupled to the processor 1321, and transmits and/or receives a radio signal. The processor 1321 implements the proposed functions, procedures, and/or methods. In the aforementioned embodiments, an operation of the second network node 1320 may be implemented by the processor 1321.

The processors 1321 may include application-specific integrated circuit (ASIC), other chipset, logic circuit and/or data processing device. The memories may include read-only memory (ROM), random access memory (RAM), flash memory, memory card, storage medium and/or other storage device. The transceivers may include baseband circuitry to process radio frequency signals. When the embodiments are implemented in software, the techniques described herein can be implemented with modules (e.g., procedures, functions, and so on) that perform the functions described herein. The modules can be stored in memories and executed by processors. The memories can be implemented within the processors or external to the processors in which case those can be communicatively coupled to the processors via various means as is known in the art.

The processor 1311 of the first network node 1310 may control the transceiver 1313 to receive information on a first cell and a second cell which is related to the first cell from a second network node. The first cell may provide a first uplink (UL) carrier and a first downlink (DL) carrier, and the second cell may provide a second UL carrier. A frequency of the first UL carrier may be higher than a frequency of the second UL carrier. The measurement configuration may inform the UE that the result of the measurement on the second cell needs to be reported with the result of the measurement on the first cell. The first cell may be a specific cell among at least one of cells managed by a secondary node (SN), and the second cell may be a supplementary uplink (SUL) cell managed by the SN for the first cell in a secondary node addition procedure. The first cell may be a specific cell among at least one of cells managed by a target base station (BS), and the second cell may be a supplementary uplink (SUL) cell managed by the target BS for the first cell in a handover procedure. The measurement configuration may include at least one of identity (ID) of the first cell, ID of the second cell, UL/DL carrier of the first cell and UL/DL carrier of the second cell.

The processor 1311 of the first network node 1310 may control the transceiver 1313 to transmit a measurement configuration including the information on the first cell and the second cell to a user equipment (UE).

The processor 1311 of the first network node 1310 may control the transceiver 1313 to receive a measurement result of the first cell and the second cell from the UE.

The processor 1311 of the first network node 1310 may control the transceiver 1313 to transmit the measurement result to the second network node.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the appended claims.

What is claimed is:

1. A method performed by a user equipment (UE) in a wireless communication system, the method comprising:
receiving a measurement configuration including information on a first cell and a second cell which is related to the first cell from a master node (MN);
performing measurement on the first cell and the second cell based on the measurement configuration; and
transmitting a result of the measurement on the first cell and the second cell to the MN based on a reporting of measurement on the first cell being triggered by the reporting configuration from the first cell,
wherein the first cell is a cell among at least one of cells managed by a secondary node (SN), and the second cell is a supplementary uplink (SUL) cell for the first cell managed by the SN in a secondary node addition procedure,
wherein the measurement configuration is determined by the MN based on SUL information being received, by the MN, from the SN,
wherein the SUL information includes a cell identity (ID) of the first cell, a cell ID of the second cell, a frequency of a first uplink (UL) carrier of the first cell, a frequency of a first downlink (DL) carrier of the first cell and a frequency of a second UL carrier of the second cell,
wherein the frequency of the first UL carrier is higher than the frequency of the second UL carrier,
wherein the measurement configuration includes at least one of the first UL carrier or the first DL carrier and represents the second UL carrier, and
wherein the reporting configuration includes information on whether the reporting of the measurement for the first cell and the second cell is triggered due to at least one event or periodically.

2. The method of claim 1, wherein the measurement configuration informs the UE that the result of the measurement on the second cell needs to be reported with the result of the measurement on the first cell.

3. The method of claim 1, wherein the MN operates as a source base station (BS) and the SN operates as a target BS in a handover procedure.

4. A method performed by a master node (MN) in a wireless communication system, the method comprising:
receiving supplementary uplink (SUL) information on a first cell and a second cell which is related to the first cell from a secondary node (SN);
transmitting a measurement configuration including the information on the first cell and the second cell to a user equipment (UE);
receiving a measurement result of the first cell and the second cell from the UE; and
transmitting the measurement result to the SN,
wherein the first cell is a cell among at least one of cells managed by the SN, and the second cell is a SUL cell for the first cell managed by the SN for in a secondary node addition procedure,
wherein the measurement configuration is determined by the MN based on SUL information being received, by the MN, from the SN,
wherein the SUL information includes a cell identity (ID) of the first cell, a cell ID of the second cell, a frequency of a first uplink (UL) carrier of the first cell, a frequency of a first downlink (DL) carrier of the first cell and a frequency of a second UL carrier of the second cell,
wherein the frequency of the first UL carrier is higher than the frequency of the second UL carrier,
wherein the measurement configuration includes at least one of the first UL carrier or the first DL carrier and represents the second UL carrier,
wherein transmission of the measurement result from the UE is triggered based on reporting configuration being received by the UE, and
wherein the reporting configuration includes information on whether the transmission of the measurement result from the UE is triggered due to at least one event or periodically.

5. The method of claim 4, wherein the measurement configuration informs the UE that the result of the measurement on the second cell needs to be reported with the result of the measurement on the first cell.

6. The method of claim 4, wherein the MN operates as a source base station (BS) and the SN operates as a target BS in the handover procedure.

7. A user equipment (UE) in a wireless communication system, the UE comprising:
a transceiver for transmitting or receiving a radio signal; and
a processor coupled to the transceiver, the processor configured to:
control the transceiver to receive a measurement configuration including information on a first cell and a second cell which is related to the first cell from a master node (MN);
perform measurement on the first cell and the second cell based on the measurement configuration; and
control the transceiver to transmit a result of the measurement on the first cell and the second cell to the MN based on a reporting of measurement on the first cell being triggered by the reporting configuration from the first cell,
wherein the first cell is a cell among at least one of cells managed by a secondary node (SN), and the second cell is a supplementary uplink (SUL) cell for the first cell managed by the SN in a secondary node addition procedure,
wherein the measurement configuration is determined by the MN based on SUL information being received, by the MN, from the SN,
wherein the SUL information includes a cell identity (ID) of the first cell, a cell ID of the second cell, a frequency of a first uplink (UL) carrier of the first cell, a frequency of a first downlink (DL) carrier of the first cell and a frequency of a second UL carrier of the second cell,
wherein the frequency of the first UL carrier is higher than the frequency of the second UL carrier,
wherein the measurement configuration includes at least one of the first UL carrier or the first DL carrier and represents the second UL carrier, and
wherein the reporting configuration includes information on whether the reporting of the measurement for the first cell and the second cell is triggered due to at least one event or periodically.

8. The method of claim 1, wherein the UE is in communication with at least one of a mobile device, a network, and/or autonomous vehicles other than the UE.

* * * * *